United States Patent [19]

Buhrer

[11] Patent Number: 4,671,613
[45] Date of Patent: Jun. 9, 1987

[54] OPTICAL BEAM SPLITTER PRISM

[75] Inventor: Carl F. Buhrer, Framingham, Mass.

[73] Assignee: GTE Laboratories Inc., Waltham, Mass.

[21] Appl. No.: 796,331

[22] Filed: Nov. 12, 1985

[51] Int. Cl.[4] .......................... G02B 27/14; G02B 6/26; G02B 5/30
[52] U.S. Cl. .................................. 350/174; 350/96.15; 350/96.18; 350/96.19; 350/166; 350/173; 350/401
[58] Field of Search ............... 350/164, 166, 170, 171, 350/172, 173, 174, 401, 403, 96.15, 96.19, 385, 388, 404

[56] References Cited

U.S. PATENT DOCUMENTS

| | | | |
|---|---|---|---|
| 3,068,743 | 12/1962 | Dyson | 350/173 |
| 3,501,640 | 3/1970 | Harris | 350/403 |
| 3,853,386 | 12/1974 | Ritter et al. | 350/164 |
| 4,420,219 | 12/1983 | Muchel | 350/96.21 |
| 4,514,046 | 4/1985 | Carlsen et al. | 350/388 |
| 4,566,761 | 1/1986 | Carlsen et al. | 350/401 |

FOREIGN PATENT DOCUMENTS

| | | | |
|---|---|---|---|
| 158967 | 10/1985 | European Pat. Off. | 350/96.15 |
| 3413704 | 10/1985 | Fed. Rep. of Germany | 350/96.15 |
| 130047 | 11/1978 | Japan | 350/96.15 |
| 2098353 | 11/1982 | United Kingdom | 350/96.15 |

Primary Examiner—John K. Corbin
Assistant Examiner—Vincent J. Lemmo
Attorney, Agent, or Firm—Fred Fisher

[57] ABSTRACT

An improved geometry for an optical beam splitter prism permits all input and output beams to be parallel and to remain parallel while the prism is misaligned. It is particularly useful in conjunction with fiber optic couplers and is applicable to splitting with respect to light intensity, polarization or wavelength. This can be achieved through the construction of a beam splitting prism having an additional reflecting surface on one input beam and on one output beam, whereby each of these surfaces are parallel to the beam splitting surface and with two parallel input and output surfaces through which all beams pass so as to make all input and output beams parallel and remain parallel as the prism is translationally or rotationally misaligned about any axis.

7 Claims, 6 Drawing Figures

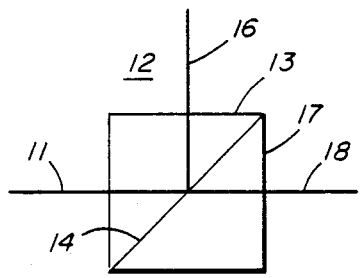
FIG. IA
PRIOR ART
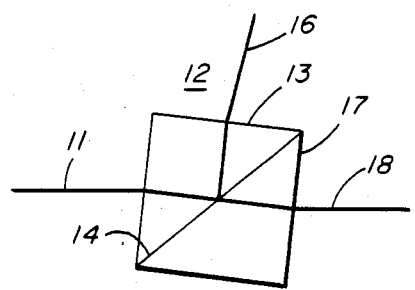
FIG. IB
PRIOR ART
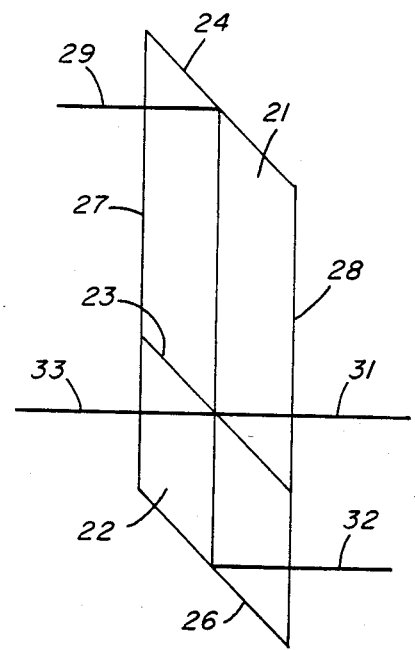
FIG. 2A
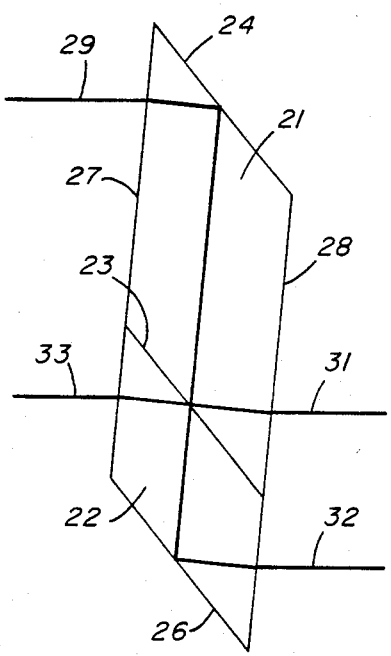
FIG. 2B

OPTICAL BEAM SPLITTER PRISM

BACKGROUND OF THE INVENTION

1. Field of the Invention

This invention relates to optical beam splitter prisms and, in particular, to optical beam splitter prisms having orientation insensitivity. Accordingly, it is a general object of this invention to provide new and improved optical beam splitter prisms of such character.

2. General Background

An optical beam splitter is based upon the separation of an incident wave, at a partially reflecting interface between two transparent media, into a reflected wave and a transmitted wave. The interface may consist of a thin metallic layer or it may consist of a multilayer thin film stack of dielectric coatings or it may consist of a combination thereof, and may be designed to reflect part of the beam intensity regardless of its polarization state or wavelength, or so as to selectively reflect one polarization state, or a band of wavelengths, and to transmit the remaining light energy. In both cases, the interface is usually planar to avoid defocusing an applied beam upon reflection. A glass prism assembly usually supports the interface layers and provides for the light beam entrances and exits. Such a cube type beam splitter of the prior art is depicted in FIG. 1A.

An incident optical beam 11 enters a glass beam splitter 12, as depicted in FIG. 1A, and passes through a first 45° prism half 13 to an interface 14. Part of the beam intensity is reflected and leaves the prism half 13 as a first output beam 16, while the remaining intensity is transmitted through a second 45° prism half 17 and leaves as a second output beam 18. The beam 16 is nominally ninety degrees in direction from that of the beam 18, but if, as depicted in FIG. 1B, the prism 12 is rotationally misaligned, the output beam 16 is changed in direction relative to the input beam 11. The output beam 18, having been refracted twice by the parallel facets of the beam splitter 12, is laterally displaced by a small amount but is still parallel to the input beam 11.

Beam splitter prism devices are useful in fiber optic systems. In these applications, the light from an optical fiber is focused into a parallel beam by a small lens, passed through a prism, and then refocused back into another fiber. The small lenses, affixed to the fiber with their focal point at the end of the fiber core, are known as expanded beam lens connectors and serve as convenient interfaces between light in a fiber and light in a parallel beam. But, for complete coupling into the fiber, the input parallel beam should have a high degree of angular accuracy with respect to the lens axis. Due to the expanded cross-sectional area of the parallel beam, lateral positioning is of secondary importance.

The shortcomings of the prior art beam splitter shown in FIGS. 1A and 1B are apparent. If optical beams 11, 16, and 18 are coupled into optical fiber with expanded beam lens connectors, the angular accuracy and coupling efficiency of the beam 16 is critically dependent upon the orientation of the beam splitter cube 12. The beam 18 which remains parallel, but with a small lateral displacement, couples much more completely with its fiber.

SUMMARY OF THE INVENTION

Another object of the present invention is to provide a new and improved optical beam splitter prism in which all input and output beams are parallel and remain parallel while the prism is rotationally misaligned about any axis.

Still another object of the present invention is to provide a new and improved interference filter type wavelength multiplexer utilizing an optical beam splitter prism in which all input and output beams are parallel and remain parallel while the prism is rotationally misaligned about any axis.

Yet another object of the invention is to provide a new and improved birefringent type filter utilizing new and improved optical beam splitter prisms in which all input and output beams are parallel and remain parallel while the prisms are rotationally misaligned about any axis.

In accordance with one aspect of the invention, an improved beam splitter prism includes a pair of prism sections joined together at an optical interface within which a partially transmitting optical coating is present. The improved prism is characterized by at least one of the sections having a respective, planar, reflective surface; and where each of the prism sections has a respective, planar, optical interface surface joined together within which the coating is present, wherein each of the planar reflective surfaces is parallel to each of the planar, optical interface surfaces and to each other. The prism has planar input and output surfaces that are parallel to each other. Thus, an input beam entering the input surface of the prism and an output beam exiting from the output surface are parallel, and remain parallel, as the prism is translationally or rotationally misaligned.

In accordance with certain features of the invention, the foregoing partially transmitting optical coating can be selected from the group consisting of a thin metallic layer, a multilayer thin film stack of dielectric coatings, and a combination thereof. In accordance with one feature of the invention, a first input beam applied to the planar input surface is reflected by the reflective surface of one of the prism sections to the optical interface. There, light having a first characteristic is transmitted through the optical interface to the reflective surface of the other prism section and is reflected outward through the output surface as a first output light beam having that first characteristic. Light having a second characteristic is reflected by the coating through the output surface as a second output light beam having that second characteristic. The first output light beam and the second output light beam are both parallel to the input light beam and to each other. In accordance with another feature of the invention, two input beams and two output beams have components having a first characteristic and a second characteristic. As the input beams reach the optical interface, those components having the first characteristic are transmitted therethrough, and those having the second characteristic are reflected by the optical interface. One output beam contains the first characteristic of the first input beam and the second characteristic of the second output beam. The other output beam contains the first characteristic of the second input beam and the second characteristic of the first input beam.

In accordance with another aspect of the invention, an interference filter type wavelength multiplexer includes a pair of prism sections joined together at an optical interface within which a partially transmitting optical coating is present. The coating consists of a multilayer stack of dielectric films that selectively reflects according to wavelength the beams incident thereto. The joined prism sections form (with the coating) a beam splitter prism. At least one prism section has a respective, planar, reflective surface, and each prism section has a respective, planar, optical interface surface joined together within which the coating is present. Each of the planar reflective surfaces is parallel to each of the planar, optical, interface surfaces and to each other. The prism has a planar input surface and a planar output surface that are parallel to each other. Thus, an input beam entering the input surface of the prism and an output beam exiting from the output surface are parallel, and remain parallel, as the prism is translationally or rotationally misaligned. A housing is provided for the beam splitter prism. The housing has a first planar reference surface in proximity to, and in general parallelism with, the input surface of the prism, and has a second planar reference surface in proximity to, and in general parallelism with, the output surface of the prism. The first planar reference surface is precisely parallel to the second planar reference surface. A plurality of expanded beam optical connectors, each having an optical axis, a planar reference surface perpendicular to the axis, a lens surface and means for orienting an optical fiber therewithin are provided. The reference surfaces of the connectors are engaged with the reference surfaces of the housing.

In accordance with still yet another aspect of the invention, a birefringent filter type wavelength multiplexer/demultiplexer includes a housing for retaining various optical components such as beam splitter prisms and a birefringent, element. The housing has a pair of opposed walls with internal and external surfaces, whose exterhal suffaces are parallel to each other, each wall having a pair of orifices therethrough. First and second expanded beam lens connectors, each having a lens for projecting light from a suitable source (such as optical fiber), are coupled to the external surface of one housing wall and aligned therewith via respective flat reference surfaces on the connectors, which reference surfaces are perpendicular to the optical axes thereof. Third and fourth expanded beam connectors are coupled to the external surface of the other housing wall so as to provide outputs to optical fiber coupled thereto. Reference surfaces of the connectors engage the flat external surface of the aforesaid other housing wall. The flat reference surfaces are perpendicular to the axes of the third and fourth connectors. All four connectors are coupled with their reference surfaces in engagement with the external surfaces of the housing at the various orifices thereof. A first beam splitter prism receives a first, applied, input expanded beam of light along a first optical axis; the second expanded beam of light is applied along the second optical axis as a second input beam thereto, thereby providing a pair of parallel split beams each having different pairs of polarization states from the first expanded and the second expanded beam. A birefringent element, oriented to receive the parallel split beams, issues a pair of parallel beams. One of the issued parallel beams is applied as one input beam to a second beam splitter prism; the other of the issued parallel beams is applied as the other input of the second beam splitter prism, thereby passing energy at one wavelength from the first connector to the third connector and from the second connector to the fourth connector. Another wavelength is applied from the first connector to the fourth connector and from the second connector to the third connector. Thus, the first expanded beam and the second expanded beam entering the first beam splitter prism, and the third expanded beam and the fourth expanded beam exiting from the second beam splitter prism, are parallel and remain parallel as the prisms are translationally or rotationally misaligned.

BRIEF DESCRIPTION OF THE DRAWINGS

Other objects, advantages, and features of this invention, together with its construction and mode of operation, will become more apparent from the following description, when read in conjunction with the accompanying drawings, in which:

FIG. 1A is a view of a cube type beam splitter of the prior art;

FIG. 1B is a view of the prior art beam splitter of FIG. 1A, slightly rotated;

FIG. 2A is a design of an optical beam splitter prism in accordance with the present invention;

FIG. 2B is a view depicting the beam splitter prism of FIG. 2A slightly rotated;

DESCRIPTION OF PREFERRED EMBODIMENTS

Figure 3A:
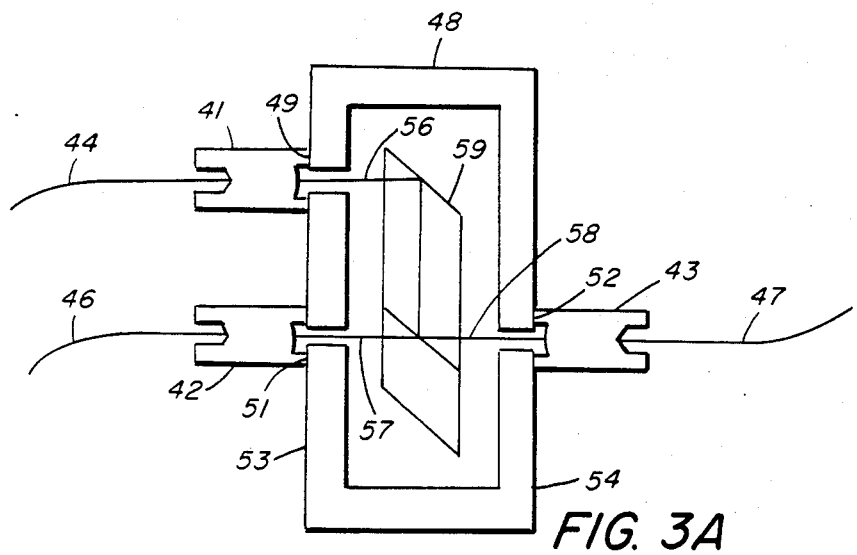
FIG. 3A is a view depicting an interference filter type wavelength multiplexer incorporating the improved beam splitter of this invention.

The prism design of the present invention is depicted in FIG. 2A. It consists of two prism sections 21 and 22 joined together, as by cement, at an interface 23 within which is present a partially transmitting coating. This coating may be a thin semitransparent metallic film or a multilayer thin film stack of dielectric coatings or a combination thereof to unselectively reflect part of the light energy or to selectvely reflect one polarization state or one band of wavelengths and transmit the remaining light energy. Prism facets 24 and 26 are precisely ground and polished to be parallel to each other and to the interface 23. Prism facets 27 and 28, which extend across the interface onto the section 22, are also ground and polished to be parallel to each other.

An input light beam 29 enters the prism section 21 and is reflected by the facet 24. It is partially reflected at the interface 23 and exits as an output beam 31 through the facet 28. The remaining light energy is transmitted into the prism section 22, reflected at the facet 26 and exits as an output beam 32, also through the facet 28. The reflecting surfaces 24 and 26 may be given mirror coatings or the reflection may be via total internal reflection if a suitably large refractive index material is chosen to construct the prism sections 21 and 22. An alternate input light beam 33 can enter the prism section 22, wherein it is partially transmitted at the interface 23 into the prism section 21 and exits as an output 31 through the facet 28. The remaining light energy is reflected at the interfaces 23 and 26 and exits from the prism section 22 as an output beam 32. Parallel prism facets 23, 24, and 26 are depicted at a nominal 45° orientation to the parallel prism facets 27, 28. However, other angles are also suitable.

Along each path through the beam splitter, depicted in FIG. 2, light undergoes two refractions at the parallel facets 27, 28 and undergoes an even number (0 or 2) of reflections at the parallel facets 23, 24, or 26. When an entire beam splitter is rotationally misoriented about any axis, including the axis normal to the drawing, as depicted in FIG. 2B, the dual refractive and dual reflective beam deviations cancel each other and the output beams 31 and 32 remain parallel to the input beams 29 and 33. Thus, the parallelism of all the input and output beams is dependent only on the degree of parallelism between the facets 27 and 28 and among the facets 23, 24, and 26. Optical finishing techniques for achieving such parallelism are well known in the art.

Lateral deviations of the output beams as the prism is rotated or translated can be readily calculated with the help of a geometric construction (not shown). There, the optical path, from where the input beam 29 enters the facet 27 to where the output beam 32 exits the facet 28, is equivalent to a straight passage of a beam through a parallel plate having a thickness t equal to the path length through the original beam splitting prism. The lateral beam shift d resulting from moving i degrees off normal incidence can be shown to be $$d = t(\tan i - \tan r) \cos i$$

where r is the angle of refraction that may be computed using the law of refraction. From this parallel plate model it is also apparent that small lateral misalignments of the beam splitting prism are insignificant on the output beams.

Figure 3B:
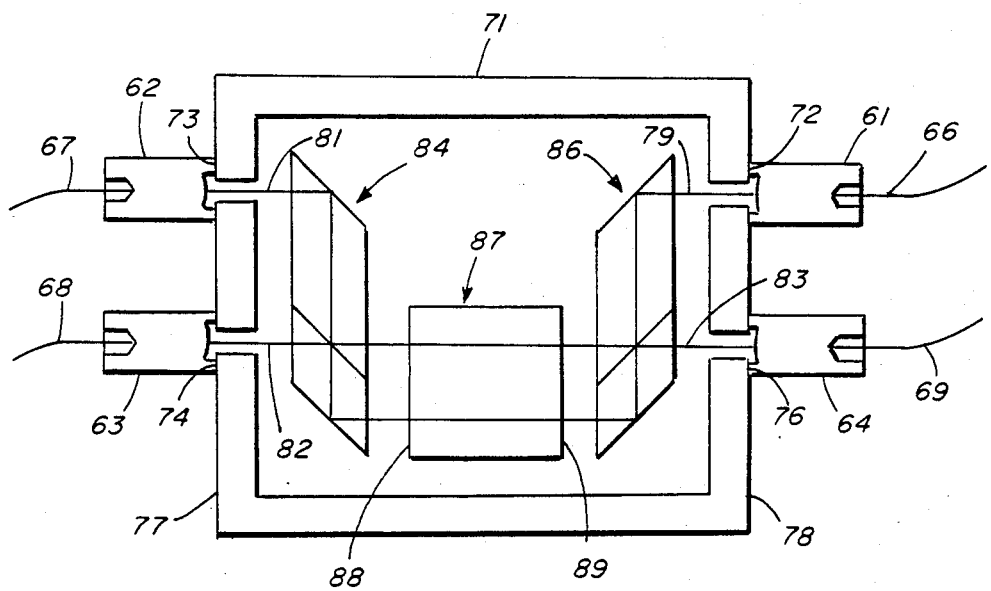
FIG. 3B is a diagram of a birefringent filter type wavelength multiplexer incorporating the optical beam splitter of this invention.

Two applications of this improved beam splitter in specific devices for fiber optic systems are shown in FIGS. 3A and 3B. An interference filter type wavelength multiplexer is shown schematically in FIG. 3A. As indicated therein, expanded beam lens connectors 41, 42 and 43 attached to the ends of optical fibers 44, 46 and 47, respectively, are pressed into contact with a metal housing 48 such that their forward flat reference surfaces 49, 51 and 52, respectively, coincide with either of the flat and parallel alignment surfaces 53 and 54 of the housing 48. As these forward reference surfaces accurately define the connector lens axes, this insures that the beams 56, 57 and 58, exiting the connectors 41 and 42 and entering the connector 43, are precisely parallel. A beam splitter prism 59, constructed as detailed hereinabove in connection with FIG. 2A, intercepts these beams and connects their paths, but since output beam 32 of FIG. 2A is not utilized, parallel prism facet 26 is not needed and may be omitted. The beam splitter prism 59 can be installed in the housing 48 with a considerable tolerance to both translational and rotational misorientation due to its design according to the present invention. At the interface 23 there exists a multilayer stack of dielectric films that selectively reflects according to wavelength the beams that are incident upon it. The design of such multilayer films for the interface is well known in the art. As a wavelength multiplexer, the fibers 44 and 46 serve as the input signals at two different wavelengths. The output signal from the fiber 44 is reflected at the interface 23 while that from the fiber 46 is transmitted at the interface 23, and both combine as an output beam 58 to be coupled to the output fiber 47. The same configuration is operable in reverse as a wavelength demultiplexer.

A birefringent filter type wavelength multiplexer or demultiplexer is depicted in FIG. 3B. As shown therein, expanded beam lens connectors 61, 62, 63, and 64 attached to the ends of optical fibers 66, 67, 68, and 69 are pressed into contact with a metal housing 71 such that their forward flat reference surfaces 72, 73, 74 and 76 coincide with either of the flat and parallel external alignment surfaces 77 and 78 of the housing 71. As above, this insures that beams 79, 81, 82 and 83 are precisely parallel. Beam splitter prisms 84 and 86, constructed as in FIG. 2, intercept these beams and connect their paths which also pass through a birefringent element 87 that is designed with precisely parallel optical facets 88 and 89. Because of this parallelism and that of the beam splitter facets, these three optical elements 84, 86, and 87 may be installed into the housing 71 with considerable tolerance to both translational and rotational misorientation.

When used as a part of a birefringent filter type optical multiplexer/demultiplexer assembly, as shown in FIG. 3B, the beam splitters 84 and 86 selectively reflect one polarization state and transmit the other at the interface 23. The design of such multilayer films for the interface is well known in the art. The birefringent element 87 may be a single crystal of a crystalline material such as quartz or calcite oriented with its principal axes of birefringence at an angle of 45 degrees relative to the principal polarization axes of beam splitters 84 and 86. This birefringent multiplexer/demultiplexer passes energy at one wavelength from the fiber 67 to the fiber 66 and from the fiber 68 to the fiber 69 and at another wavelength from the fiber 67 to the fiber 69 and from the fiber 68 to the fiber 66. These inputs do not need to have a specific polarization state as both polarization components are processed simultaneously by this device.

The foregoing are but two examples of how the instant invention can be incorporated into fiber optic devices.

Various modifications can be performed without departing from the spirit and scope of this invention.

What is claimed is:

1. An improved beam splitter prism comprising
    a partially transmitting optical coating, and
    two prism sections joined together at an optical interface within which said coating is present, wherein the improvement comprises
        both of said prism sections having a respective planar fully reflective surface, and
        each of said prism sections having a respective planar optical interface surface joined together within which said coating is present, wherein
            each said planar fully reflective surface is parallel to each of said planar optical interface surfaces and to each other; and
        said prism having a planar input surface and a planar output surface, wherein
    said input surface is parallel to said output surface, whereby
    all input beams entering said input surface of said prism, and all output beams exiting from said output surface are parallel, and remain parallel, as said prism is translationally or rotationally misaligned about any axis.

2. The improvement as recited in claim 1 wherein said partially transmitting optical coating is selected from the group consisting of
    a thin metallic layer,
    a multilayer thin film stack of dielectric coatings, and
    any combination thereof.

3. The improvement as recited in claim 1 wherein a first input light beam applied to said planar input surface is reflected by said reflective surface of one of said prism sections to said optical interface, wherein light having a first characteristic is transmitted through said optical interface to said reflective surface of the other of said prism sections, and reflected outward through said output surface as a first output light beam having said first characteristic, and light having a second characteristic is reflected by said coating through said output surface as a second output light beam having said second characteristic, said first output light beam and said second output light beam being parallel to said first input light beam.

4. The improvement as recited in claim 1 wherein a first input light beam applied to said planar input surface is reflected by said reflective surface of one of said prism sections to said optical interface, wherein light having a first characteristic is transmitted through said optical interface to said reflective surface of the other of said prism sections, and reflected outward through said output surface as a first component of a first output light beam, having said first characteristic, and light having a second characteristic is reflected by said coating through said output surface as a first component of a second output light beam having said second characteristic; and a second input light beam applied to said planar input surface is directed to said optical interface, wherein light from said second input beam having said second characteristic is reflected by said optical coating to said reflective surface of the other of said prism sections, and reflected outward through said output surface as a second componene tof said first output light beam having said second characteristic, and light from said second input beam having said first characteristic is transmitted through said optical coating through said output surface as a second component of said second output light beam, having said first characteristic.

5. A birefringent filter type wavelength multiplexer/demultiplexer comprising a housing for retaining optical components therewithin, said housing including a pair of opposed walls having internal and external surfaces, said external surfaces being parallel to each other, each of said walls having a pair of orifices therethrough;

a first expanded beam lens connector having a lens for projecting a first expanded beam of light along a first optical axis, and a flat reference surface perpendicular to said first axis;

a second expanded beam lens connector having a lens for projecting a second expanded beam of light along a second optical axis, and a flat reference surface perpendicular to said second axis;

a third expanded beam lens connector having a lens for receiving a third expanded beam of light from along a third optical axis, and a flat reference surface perpendicular to said third axis;

a fourth expanded beam lens connector having a lens for receiving a fourth expanded beam of light from along a fourth optical axis, and a flat reference surface perpendicular to said fourth axis, said first connector being coupled to said housing with said first connector reference surface in engagement with the external surface of one of said walls at one of said orifices thereof, said second connector being coupled to said housing with said second connector reference surface in engagement with the external surface of said one of said walls at the other of said orifices thereof, said third connector being coupled to said housing with said third connector reference surface in engagement with the external surface of the other of said walls at one of said orifices thereof, and said fourth connector being coupled to said housing with said fourth connector reference surface in engagement with the external surface of the other of said walls at the other of said orifices thereof, whereby said first optical axis is parallel to said second optical axis, said third optical axis is parallel to said fourth optical axis, and said first optical axis is parallel to at least one of said third and said fourth optical axes;

a first beam splitter prism as recited in claim 5 wherein said first expanded beam of light along said first optical axis is applied as said first input beam thereto, and said second expanded beam of light along said second optical axis is applied as said second input beam thereto, thereby providing a pair of parallel split beams each having different pairs of polarization states from said first expanded beam and said second expanded beam;

a birefringent element, oriented to receive said parallel split beams, and to issue a pair of parallel beams; and a second beam splitter prism as recited in claim 4 wherein one of the issued parallel beams is applied as one input beam thereto, and the other of the issued parallel beams is applied as the other input beam thereto, thereby passing energy at one wavelength from said first connector to said third connector and from said second connector to said fourth connector, and at another wavelength from said first connector to said fourth connector and from said second connector to said third connector, whereby said first expanded beam and said second expanded beam entering said first beam splitter prism, and said third expanded beam and said fourth expanded beam exiting said second beam splitter prism are parallel, and remain parallel, as said prisms are translationally or rotationally misaligned about any axis.

6. An interference filter type wavelength multiplexer comprising a partially transmitting optical coating consisting of a multilayer stack of dielectric films that selectively reflects according to wavelength the beams incident thereto, two prism sections joined together at an optical interface within which said coating is present, thereby forming, with said coating, a beam splitter prism, both said prism sections having a respective planar fully reflective surface, and each said prism section having a respective planar optical interface surface joined together within which said coating is present, wherein each said planar fully reflective surface is parallel to each of said planar optical interface surfaces and to each other; and said prism having a planar input surface and a planar output surface, wherein said input surface is parallel to said output surface, whereby all input beams entering said input surface of said prism, and all output beams exiting from said output surface are parallel, and remain parallel, as said prism is translationally or rotationally misaligned about any axis;

a housing for said beam splitter prism, having a first planar reference surface in proximity to and in general parallelism with said input surface of said prism, and having a second planar reference surface in proximity to and in general parallelism with said output surface of said prism, said first planar reference surface being precisely parallel to said second planar reference surface; and a plurality of expanded beam optical connectors, each said connector having an optical axis, a planar reference surface perpendicular to said axis, a lens surface, and means for orienting an optical fiber therewithin, whereby said reference surfaces of said connectors are engaged with said reference surfaces of said housing.

7. The multiplexer as recited in claim 6 wherein both said prism sections have a respective planar reflective surface.

* * * * *